United States Patent
Ni et al.

(10) Patent No.: US 9,084,158 B2
(45) Date of Patent: Jul. 14, 2015

(54) SUPPLEMENTARY SERVICE IMPLEMENTATION METHOD, LTE NETWORK SYSTEM AND MOBILE TERMINAL

(71) Applicant: SPREADTRUM COMMUNICATIONS (SHANGHAI) CO., LTD., Shanghai (CN)

(72) Inventors: Jinjin Ni, Shanghai (CN); Yi Jin, Shanghai (CN); Xichun Gao, Shanghai (CN); Xianliang Chen, Shanghai (CN)

(73) Assignee: SPREADTRUM COMMUNICATIONS (SHANGHAI) CO., LTD. (CN)

( * ) Notice: Subject to any disclaimer, the term of this patent is extended or adjusted under 35 U.S.C. 154(b) by 0 days.

(21) Appl. No.: 14/240,007

(22) PCT Filed: Dec. 21, 2012

(86) PCT No.: PCT/CN2012/087186
§ 371 (c)(1),
(2) Date: Feb. 20, 2014

(87) PCT Pub. No.: WO2014/094307
PCT Pub. Date: Jun. 26, 2014

(65) Prior Publication Data
US 2015/0138974 A1    May 21, 2015

(51) Int. Cl.
    *H04W 36/04* (2009.01)
    *H04W 36/00* (2009.01)
    *H04W 28/02* (2009.01)

(52) U.S. Cl.
    CPC ...... *H04W 36/0022* (2013.01); *H04W 28/0289* (2013.01)

(58) Field of Classification Search
    None
    See application file for complete search history.

(56) References Cited

U.S. PATENT DOCUMENTS

| 2007/0254681 A1 | 11/2007 | Horvath et al. |
| 2010/0120455 A1 | 5/2010 | Aghili et al. |

(Continued)

FOREIGN PATENT DOCUMENTS

| CN | 101442812 A | 5/2009 |
| CN | 102160403 A | 8/2011 |

(Continued)

OTHER PUBLICATIONS

3GPP TS 24.301 v11.1.0 (Dec. 2011), 3rd Generation Partnership Project; Technical Specification Group Core Network and Terminals; Non-Access-Stratum (NAS) protocol for Evolved Packet System (EPS); Stage 3 (Release 11), Dec. 2011, 326 pages.*

(Continued)

*Primary Examiner* — Hoon J Chung
(74) *Attorney, Agent, or Firm* — Cantor Colburn LLP

(57) ABSTRACT

A supplementary service implementation method, a Long Term Evolution (LTE) network system and a mobile terminal are provided. The method may include: receiving an Uplink NAS Transport message from a mobile terminal; analyzing the Uplink NAS Transport message; and performing a supplementary service if an SS message is determined to be contained in the Uplink NAS Transport message based on a NAS message container of the Uplink NAS Transport message. The method in the present disclosure can solve problems that an LTE terminal can not directly provide CISS when it is in an LTE network, or it has to fall back to a circuit-switched 3G/2G network so as to support CISS. Therefore, the method can reduce overheads introduced by network switching, and improve performances of LTE networks and LTE mobile terminals.

11 Claims, 5 Drawing Sheets

(56) References Cited

U.S. PATENT DOCUMENTS

2010/0265884 A1    10/2010    Vikberg et al.
2012/0064884 A1    3/2012    Ramachandran et al.

FOREIGN PATENT DOCUMENTS

| | | | |
|---|---|---|---|
| EP | 2291052 A1 | 3/2011 | |
| EP | 2680625 A2 * | 1/2014 | ............. H04W 4/14 |
| WO | WO 2011/120453 A2 * | 10/2011 | ............. H04W 4/14 |
| WO | 2012092071 A1 | 7/2012 | |

OTHER PUBLICATIONS

Extended European Search Report for the international patent application No. 13188046.0-1854, dated May 26, 2014.

Poikselka, Miikka et al., "VoLTE End to End and Signalling", Voice Over LTE, Feb. 1, 2012; 117 pages.

* cited by examiner

SUPPLEMENTARY SERVICE IMPLEMENTATION METHOD, LTE NETWORK SYSTEM AND MOBILE TERMINAL

This is the U.S. national stage of application No. PCT/CN2012/087186, filed on 21 Dec. 2012, the disclosure of which is also incorporated herein by reference.

TECHNICAL FIELD

The present disclosure generally relates to communication field, and more particularly, to a supplementary service implementation method, a Long Term Evolution (LTE) network system and a mobile terminal.

BACKGROUND

LTE is a mainstream technology developed from $3^{th}$ Generation (3G) mobile communication technology to $4^{th}$ (4G) mobile communication technology, which adopts Orthogonal Frequency Division Multiplexing (OFDM) and Multiple-Input Multiple-Output (MIMO) as its sole standard for wireless network evolution, and improves and enhances air access of 3G communication technology. LTE technology may provide peak rates of 100 Mbit/s downlink and 50 Mbit/s uplink in the bandwidths of 20 MHz, which may improve performance of cell-edge users, increase cell capacity and reduce system delay.

LTE network is a packet-switched network. Subject to performances of LTE-compatible mobile terminals and initial network configuration, if an LTE-compatible mobile terminal attempts to make a voice call, the mobile terminal will switch to a 2G/3G network. LTE network can not provide services through Circuit Switch (CS) domain. Data services, such as short messages, can be transmitted through LTE Packet Switch (LTE PS) domain. LTE-compatible mobile terminals may switch to the 3G/2G network through Circuit Switched Fallback (CSFB) or Single Radio Voice Call Continuity (SRVCC), so as to provide voice services.

Supplementary services may be classified into two kinds: Call Dependent Supplementary service and Call Independent Supplementary service (CISS). The Call Dependent Supplementary service refers to a service which is performed in the process of communication, such as call on hold, multi-party communication, etc. The Call Independent Supplementary service (CISS) refers to a service which may not be performed in the process of communication, such as Unstructured Supplementary Service Data (USSD), call forwarding query, call forwarding setting, and call waiting setting, etc.

Nowadays, LTE network can not directly support Call Independent Supplementary service (CISS). However, CISS operations are frequently used by consumers. Falling back to a circuit-switched 3G/2G network for CISS operations will bring unexpected large overheads, which may affect other services and interfere with the user experience.

For example, if CSFB is used to fall back to a circuit-switched 3G/2G network, the process of fallback may be described as follows. Firstly, a User Equipment (UE) initiates a supplementary service request to an LTE network. The LTE network makes a response to the request and triggers the fallback process. However, there exist uncertainties during messages exchange, such as poor quality of LTE network link or low response speed of network. These uncertainties may cause CISS to be delayed for a long time, and even failed. In the meantime, there is a need to process data services of the UE transmitted in the LTE PS domain. These data services may be suspended or may be processed after the mobile terminal falls back to a 3G/2G network.

Typically, CISS operations are transitory and discontinuous. Therefore, if CISS is implemented through CSFB, it is costly and may affect other services in the PS domain which may influence performance of the mobile terminal. Because CISS operations, such as call forwarding setting, call waiting setting and USSD are expected by consumers, improvements are needed. Currently, there is no effective method to implement CISS in an LTE mobile terminal.

The conventional art has the following disadvantages. The conventional LTE network can not provide services in CS domain, and the conventional LTE mobile terminal can not support CISS operations in an LTE network. On the other hand, although the mobile terminal may fall back to a circuit-switched 3G/2G network for CISS implementation through CSFB, the system switch may bring unexpected large overheads, and further adversely influence performances of the network and mobile terminal.

More information may refer to patent application No. US 20120064884 A1. This application provides an LTE-compatible mobile terminal which falls back to other network through CSFB to implement CS domain services.

SUMMARY

Embodiments of this disclosure provide a supplementary service implementation method, a Long Term Evolution (LTE) network system and a mobile terminal, which may overcome problems that an LTE mobile terminal can not directly provide CISS operations in the LTE network, or the LTE mobile terminal can provide CISS operations only in the event of falling back to 3G/2G networks through CSFB.

In one embodiment, a supplementary service implementation method is provided. The method may include:

receiving an Uplink Transport message from a mobile terminal;

analyzing the Uplink Transport message; and performing a supplementary service if an SS message is determined to be contained in the Uplink Transport message based on a message container of the Uplink Transport message.

In some embodiments, the Uplink Transport message is an Uplink NAS Transport message, and a message container is a NAS message container.

In some embodiments, analyzing the Uplink NAS Transport message comprises: receiving an Uplink Unitdata message transformed from the Uplink NAS Transport message; and analyzing the NAS message container in the Uplink Unitdata message.

In some embodiments, analyzing the NAS message container in the Uplink Unitdata message comprises: determining, according to a PD field in the NAS message container, whether an SS message is contained in the Uplink NAS Transport message.

In some embodiments, the step of receiving an Uplink NAS Transport message from a mobile terminal is performed by MME; the step of analyzing the Uplink NAS Transport message is performed by MSC; and the step of performing a supplementary service is performed by an SS module.

In some embodiments, the MME transforms the Uplink NAS Transport message into the Uplink Unitdata message; the MSC receives the Uplink Unitdata message from the MME, and determines, according to the PD field in the NAS message container, whether an SS message is contained in the Uplink NAS Transport message; and the SS module performs the supplementary service if an SS message is contained in the Uplink NAS Transport message.

In some embodiments, packaging the SS message into a Downlink NAS Transport message; and sending the Downlink NAS Transport message to the mobile terminal.

In some embodiments, packaging the SS message into a Downlink NAS Transport message comprises: writing the SS message into a NAS message container of the Downlink NAS Transport message.

In some embodiments, the SS message comprises an identifier which is contained in a PD field of the NAS message container of the Downlink NAS Transport message.

In some embodiments, packaging the SS message into a Downlink NAS Transport message comprises: packaging the SS message into a Downlink Unitdata message; and transforming the Downlink Unitdata message to a Downlink NAS Transport message.

In some embodiments, the Uplink Transport message is an Uplink Generic NAS Transport message; and the NAS message container is a Generic NAS message container.

In some embodiments, the method may further include packaging the SS message into a Downlink Generic NAS Transport message; and sending the Downlink Generic NAS Transport message to the mobile terminal.

In some embodiments, the method may further include establishing a connection with the terminal in PS domain.

In one embodiment, an LTE network system is provided.

The LTE network system may include: MME, configured to receive an Uplink NAS Transport message from a mobile terminal; MSC, configured to analyze the Uplink NAS Transport message and determine, based on a NAS message container of the Uplink NAS Transport message, whether an SS message is contained in the Uplink NAS Transport message; and an SS module, configured to perform a supplementary service if an SS message is determined to be contained in the Uplink NAS Transport message.

In some embodiments, the Uplink Transport message is an Uplink NAS Transport message, and a message container is a NAS message container.

In some embodiments, the MME is further configured to transform the Uplink NAS Transport message into an Uplink Unitdata message; and the MSC is configured to analyze a NAS message container in the Uplink Unitdata message.

In some embodiments, the MSC is further configured to package the SS message into a Downlink Unitdata message; and the MME is further configured to transform the Downlink Unitdata message into a Downlink NAS Transport message.

In some embodiments, the Uplink NAS Transport message is Uplink Generic NAS Transport message; and the NAS message container is Generic NAS message container.

In some embodiments, the MSC is further configured to package the SS message into a Downlink Unitdata message; and the MME is further configured to transform the Downlink Unitdata message into a Downlink Generic NAS Transport message.

In one embodiment, an implementation method of supplementary service is provided. The method may include:
  receiving a Downlink Transport message from a network;
  analyzing the Downlink Transport message; and
  performing a supplementary service if an SS message is determined to be contained in the Downlink Transport message based on a message container of the Downlink Transport message.

In some embodiments, the Downlink Transport message is a Downlink NAS Transport message, and a message container is a NAS message container.

In some embodiments, analyzing the Downlink NAS Transport message comprises: determining, according to a PD field in the NAS message container, whether an SS message is contained in the Downlink NAS Transport message.

In some embodiments, the method may further include: packaging the SS message into an Uplink NAS Transport message; and sending the Uplink NAS Transport message to the network.

In some embodiments, packaging the SS message into an Uplink NAS Transport message comprises: writing the SS message into a NAS message container of the Uplink NAS Transport message.

In some embodiments, the SS message comprises an identifier which is contained in the PD field of the NAS message container of the Uplink NAS Transport message.

In some embodiments, the Downlink NAS Transport message is Downlink Generic NAS Transport message; and the NAS message container is Generic NAS message container.

In some embodiments, the method may further include: packaging the SS message into an Uplink Generic NAS Transport message; and transmitting the Uplink Generic NAS Transport message to the network.

In one embodiment, an implementation method of supplementary service in a mobile terminal is provided. The method may include:
  packaging an SS message into an Uplink Generic Transport message; and
  transmitting the Uplink Transport message to a network.

In some embodiments, the Uplink Transport message is an Uplink NAS Transport message.

In some embodiments, packaging an SS message into an Uplink NAS Transport message comprises: writing the SS message into a NAS message container of the Uplink NAS Transport message.

In some embodiments, the SS message comprises an identifier which is contained in a PD field of the NAS message container of the Uplink NAS Transport message.

In some embodiments, the method may further include establishing a connection with the network in PS domain.

In some embodiments, the method may further include: after an SS message to be transmitted to the network is generated, determining a type of a network in which the mobile terminal is standing by; and if the mobile terminal is standing by in an LTE network, packaging the SS message into the Uplink NAS Transport message.

In some embodiments, if the mobile terminal is standing by in a 3G/2G network, the mobile terminal implements a supplementary service in a circuit domain.

In some embodiments, the Uplink NAS Transport message is Uplink Generic NAS Transport message.

In one embodiment, a mobile terminal is provided.

The mobile terminal may include: a receiving unit, configured to receive an Downlink Transport message from a network; an analyzing unit, configured to analyze the Downlink Transport message; and determine, based on a message container of the Downlink Transport message, whether an SS message is contained in the Downlink Transport message; and an SS module, configured to perform a supplementary service if an SS message is determined to be contained in the Downlink Transport message.

In some embodiments, the Downlink Transport message is a Downlink NAS Transport message, and a message container is a NAS message container.

In some embodiments, the mobile terminal may further include: a packaging unit which is configured to package an SS message into an Uplink NAS Transport message; and a transmitting unit which is configured to transmit the Uplink NAS Transport message to the network.

In some embodiments, the mobile terminal may further include: a judging unit which is configured to determine a type of a network in which the mobile terminal is standing by, after an SS message to be transmitted to the network is generated.

In some embodiments, the Downlink NAS Transport message is Downlink Generic NAS Transport message; and the NAS message container is Generic NAS message container.

In one embodiment, a mobile terminal is provided.

The mobile terminal may include: an SS module, configured to perform a supplementary service; a packaging unit, configured to package an SS message into an Uplink Transport message; and a transmitting unit, configured to transmit the Uplink Transport message to a network.

In some embodiments, the Uplink Transport message is an Uplink NAS Transport message; and the packaging unit writes the SS message into a NAS message container of the Uplink NAS Transport message.

In some embodiments, the Uplink NAS Transport message is Uplink Generic NAS Transport message; and the packaging unit writes the SS message into a NAS message container of the Uplink Generic NAS Transport message.

In some embodiments, the mobile terminal may further include: a judging unit which is configured to determine, after an SS message to be transmitted to the network is generated, a type of a network in which the mobile terminal is standing by.

Compared with the prior art, this disclosure has the following advantages:

An implementation method of supplementary services in an LTE network is provided in embodiments of the present disclosure, which solve problems that an LTE terminal can not directly provide CISS when it is in an LTE network, or it has to fall back to a circuit-switched 3G/2G network so as to support CISS. Therefore, the method can reduce overheads introduced by network switching, and improve performances of LTE network and LTE mobile terminal.

DETAILED DESCRIPTION

In order to clarify the objects, characteristics and advantages of the disclosure, the embodiments of the present disclosure will be described in detail in conjunction with the accompanying drawings. The disclosure will be described with reference to certain embodiments. It will be understood by those skilled in the art that various changes may be made without departing from the spirit or scope of the disclosure. Accordingly, the present disclosure is not limited to the embodiments disclosed.

Figure 1:
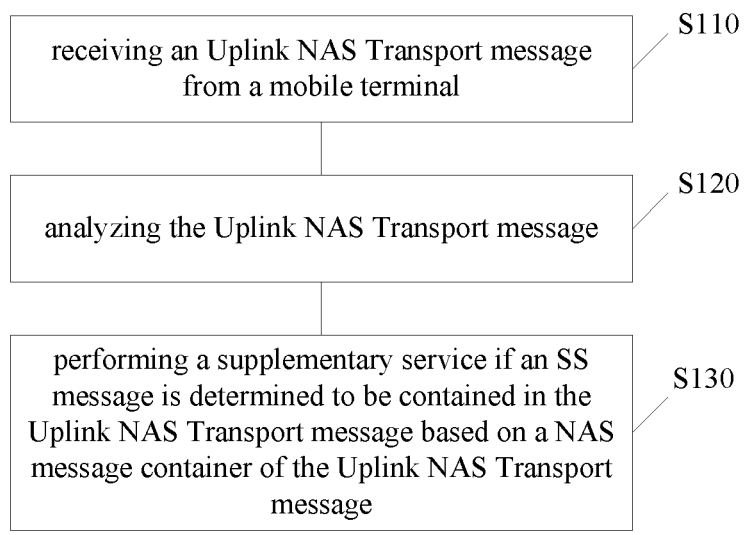
FIG. 1 schematically illustrates a flow chart of a supplementary service implementation method according to one embodiment of the present disclosure.

FIG. 1 schematically illustrates a flow chart of a supplementary service implementation method according to one embodiment of the present disclosure.

Referring to FIG. 1, the supplementary service implementation method may include steps of S110 to S130.

In S110, an Uplink NAS Transport message is received from a mobile terminal.

In some embodiments, when combinedly attached to the LTE network, the mobile terminal sends a CISS request to the network, establishes a signaling connection in PS domain with the network, and sends an Uplink NAS Transport message to the network. The Uplink NAS Transport message from the mobile terminal is received by the network side.

In S120, the Uplink NAS Transport message is analyzed.

In some embodiments, a Protocol Discriminator (PD) field in a NAS Message Container of the Uplink NAS Transport message may be used to determine whether the message carried therein is a Supplementary Service (SS) message.

In S130, if the message carried in the Uplink NAS Transport message is determined, according to the NAS Message Container of the Uplink NAS Transport message, to be a Supplementary service message, the Supplementary service is performed.

In some embodiments, if the PD field indicates that the message carried in the Uplink NAS Transport message is a Supplementary service message, a corresponding CISS operation is performed.

Specifically, the SS message may be a CISS operation, such as, call forwarding setting, call waiting setting, USSD, etc.

It should be noted that, in order that an LTE mobile terminal can implement CISS operations in the LTE network, the SS message needs to be packaged and analyzed in an empty message in the LTE network. It is found that the SS message may be transmitted through a NAS Message Container of an Uplink NAS Transport message or a Downlink NAS Transport message according to the LTE protocol.

Non-Access Stratum (NAS) protocol is used to manage data transmission between a UE and a Core Network (CN), where the data may include user information or control information, such as service establishment, service release, or mobility management. NAS data is transmitted according to an underlying Access Stratum (AS) protocol. The NAS data is independent from the underlying Access Stratum (AS) protocol, that is, it is irrelevant to wireless access network.

Table 1 illustrates a block diagram of a NAS Message Container format of the 3rd Generation Partnership Project (3GPP), according to one embodiment.

TABLE 1

| 8 | 7 | 6 | 5 | 4 | 3 | 2 | 1 | |
|---|---|---|---|---|---|---|---|---|
| NAS message container IEI | | | | | | | | octet 1 |
| Length of NAS message container contents | | | | | | | | octet 2 |
| NAS message container contents | | | | | | | | octet 3 |
| | | | | | | | | octet n |

Referring to Table 1, the first octet contains a "NAS message container IEI (identifier)". The second octet contains a length of the NAS message container content. The remaining octets may contain the NAS message container contents. The existing NAS message container mainly includes Short Messaging Service (SMS) message.

The coding scheme of the header of an SS message is similar to that of an SMS message. The header is composed of two nibbles: PD and Transaction Identity (TI).

Table 2 illustrates a block diagram of a header coding of an SS message, according to one embodiment.

TABLE 2

| IEI | Information element | Type / Reference | Presence | Format | Length |
|---|---|---|---|---|---|
| | Supplementary service protocol discriminator | Protocol discriminator 3.2 | M | V | 1/2 |
| | Transaction identifier | Transaction identifier 3.3 | M | V | 1/2 |

Because the nibble PD may be used to identify different protocol modules, for example, if the PD value is '9', the message is identified to be an SMS message, while if the PD value is '11', the message is identified to be an SS message. Therefore, whether an SS message or an SMS message is contained in a NAS message container can be determined by analyzing the nibble PD. That is, when an SS message is packaged into a NAS message container by the transmitter, it then can be identified by the receiver according to the PD field by analyzing the NAS message container.

Therefore, the CISS operation in the LTE PS domain can be implemented by packaging and analysis of messages in the LTE network and by exchanging messages between a terminal and the network.

Specifically, packaging and analysis of messages in the LTE network will be described as follows. When a terminal attempts to exchange an SS message with a network, the terminal may package the SS message into a NAS message container of an Uplink NAS Transport message. The network may analyze the NAS message container after receiving the Uplink NAS Transport message to identify the SS message contained in the NAS message container. Then, the SS message is transmitted to an SS module for processing. The network may encapsulate the SS message into a NAS message container of a Downlink NAS Transport message. The terminal may analyze the NAS message container after receiving the Downlink NAS Transport message to identify the SS message contained in the NAS message container. Then, the SS message is transmitted to an SS module of the terminal for processing.

Specifically, exchanging messages between a terminal and a network will be described as follows. When a terminal sends an SS message, the terminal may send the SS message to a Mobile Management Entity (MME) through an Uplink NAS Transport message. The MME sends the SS message through an Uplink Unitdata to a Mobile Switching Center (MSC). The MSC sends the SS message to a corresponding SS module for processing. When a network sends an SS message, the SS module delivers the SS message to the MSC. The MSC sends the SS message to the MME through a Downlink Unitdata. The terminal receives the SS message which is transmitted through a Downlink NAS Transport message from the MME. Then the SS message is delivered to the SS module of the terminal for processing.

It should be noted that the SS message may be packaged or analyzed through other types of Uplink NAS Transport messages or other types of Downlink NAS Transport messages, for example, which may include an Uplink Generic NAS Transport message, a Downlink Generic NAS Transport message.

Figure 2:
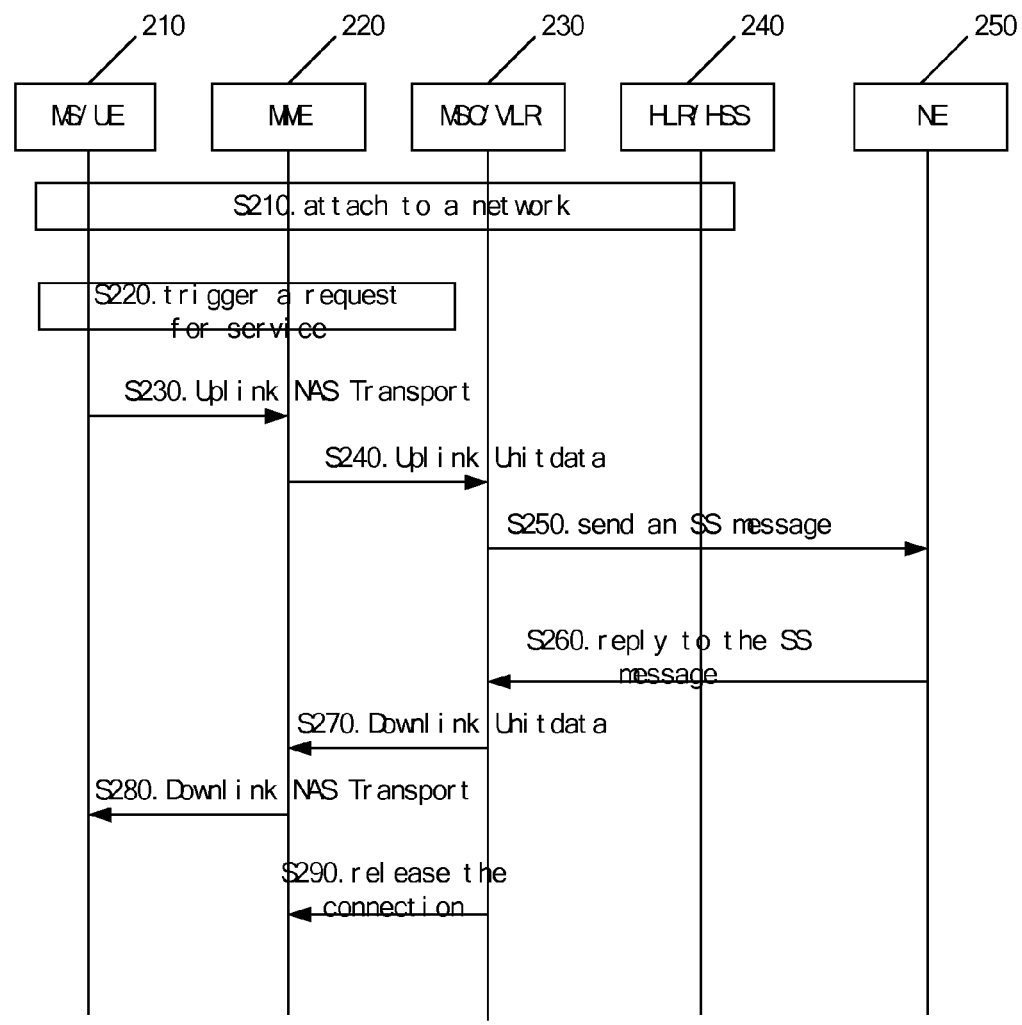
FIG. 2 schematically illustrates a flow chart of SS-message-exchange method between an LTE terminal and a network according to one embodiment of the present disclosure.

FIG. 2 schematically illustrates a flow chart of an SS-message-exchange method between an LTE terminal and a network according to one embodiment of the present disclosure.

Referring to FIG. 2, MS/UE 210 (Mobile Station, MS) according to one embodiment of the present disclosure may be a multi-mode terminal which can support multiple access technologies and mobile technologies developed subsequently. For example, the MS/UE 210 can support access technologies of 2G, 3G and LTE.

MME 220 is a key control node in the 3GPP LTE network, which is in charge of positioning and paging of a mobile terminal in an idle state.

MSC/VLR 230 is a core of the whole GSM network, which controls all services of a Base Station Controller (BSC), and provides exchange function and connection function with other modules of the system. The MSC may directly or via a mobile gateway provide an access to a fixed network, such as Public Switched Telephone Network (PSTN), Integrated Service Digital Network (ISDN), Public Data Network (PDN), etc., so as to establish connections between mobile users, or between a mobile user with a fixed network user. A Visited Location Register (VLR) may dynamically stores related data of a mobile user, such as location information and parameters of supplementary service, which enters into its control range. And a VLR may provide conditions for call connection necessitated for a registered mobile user. A VLR of a mobile terminal may obtain and store user data from a Home Location Register (HLR) which the mobile terminal belongs to. And the VLR may provide necessary user data to MSC when the MSC performs mobile services. Typically, a VLR is integrated in an MSC.

HLR of HLR/HSS 240 is a central data bank of Global System of Mobile communication (GSM), which stores data of all home subscribers, such as users' numbers, users' category, roaming ability, profile services and supplementary services, etc. In addition, HLR may store dynamic data related to each home subscriber, such as, MSC/VLR address (namely, location information) where a user roams currently, and supplementary services allocated to the user. Home Subscriber Server (HSS) is a principal user data bank of a network entity which is in charge of invoking and communication. HSS may include user profiles, information about performing user authentication and authorization, and information about users' physical location.

Network Element (NE) 250 may be a device in LTE network, such as USSD server. USSD is an interactive data service.

Referring to FIG. 2, an SS-message-exchange method between an LTE terminal and a network is provided, which may include steps of S210 to S290.

In S210, attach to a network.

In some embodiments, S210 means that a terminal is combinedly attached to an LTE network. Specifically, the terminal may establish a connection to MME and MSC, and registered with MME and MSC.

In S220, trigger a service request.

In some embodiments, after the terminal is combinedly attached to the LTE network, the terminal may trigger a service request if it wants to exchange CISS with the network. The terminal establishes a signaling connection in PS domain with the LTE network.

In S230, transmit an Uplink NAS Transport message.

In some embodiments, the terminal may package the SS message into a NAS message container of the Uplink NAS Transport message. The SS message can be transmitted to MME by the Uplink NAS Transport message.

In S240, transmit an Uplink Unitdata.

In some embodiments, MME sends an Uplink Unitdata to MSC. MSC analyzes the NAS message container after receiving the Uplink Unitdata, so as to identify the SS message. Then the SS message is delivered to an SS module for processing.

In S250, deliver the SS message.

In some embodiments, if the SS message content is related to services of call forwarding setting or call waiting setting, the SS module may directly process the related services. If the SS message content is related to services of an USSD service, the SS module may transform the SS message into an USSD message which is delivered to an USSD server for processing.

In S260, reply to the SS message.

In some embodiments, after the USSD message is processed by the USSD server, the USSD server may return a processing result to MSC.

In S270, transmit a Downlink Unitdata.

In some embodiments, after the SS module processed the SS message, the SS message is transmitted to MSC. MSC may package the SS message into a NAS message container of a Downlink NAS Transport message, and send it to MME through a Downlink Unitdata.

In S280, transmit a Downlink NAS Transport message.

In some embodiments, according to the received Downlink Unitdata, MME may transmit the SS message to a SS module of a terminal for processing. Specifically, the terminal may analyze the NAS message container after receiving the Downlink NAS Transport message, so as to identify the SS message. Then the SS message is delivered to the SS module of the terminal for processing.

In S290, release the connection.

In some embodiments, a CISS request between an LTE terminal and a network is finished after the steps of S210 to S280. Then, a request result is returned and the process of this request service is finished.

Compared with the prior art, embodiments of this present disclosure have the following advantages.

An implementation method of CISS operation is provided in embodiments of the present disclosure, which solve problems that an LTE terminal can not directly provide CISS when it is in an LTE network, or it has to fall back to a circuit-switched 3G/2G network so as to support CISS. Therefore, the method improves performances of networks and mobile terminals.

According to an implementation method of supplementary services described above, an LTE network is provide.

Figure 3:
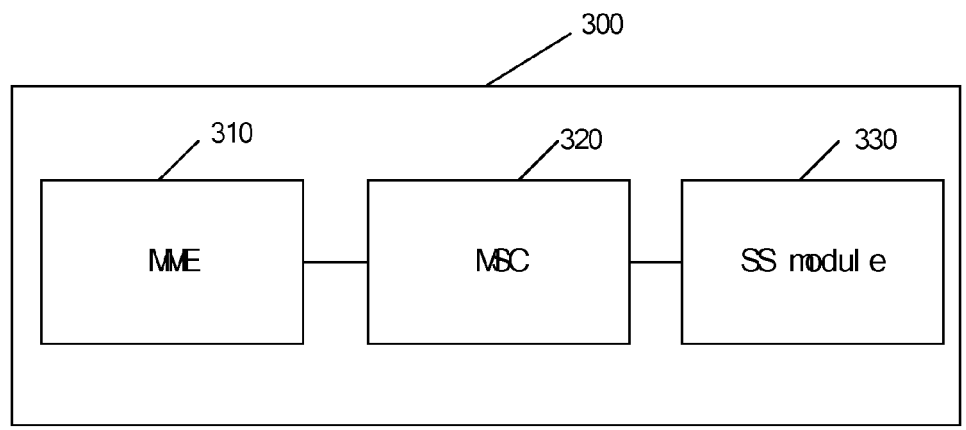
FIG. 3 schematically illustrates a network system architecture according to one embodiment of the present disclosure.

FIG. 3 schematically illustrates a system architecture of an LTE network according to one embodiment of the present disclosure.

Referring to FIG. 3, an LTE network includes MME 310, MSC 320 and an SS module 330.

In some embodiments, when a terminal is combinedly attached to the LTE network, the terminal needs to establish a signaling connection in PS domain with the LTE network if it attempts to exchange CISS with the network.

The process of combinedly attach to the LTE network needs to be interactive with network elements, such as MME, MSC, VLR and HLR. The mobile terminal needs to establish connections with the above mentioned network elements, so as to finish registration with the LTE network.

The establishment of signaling connection in PS domain with the LTE network is triggered by the terminal after it sends a service request, which is known to those skilled in the art, and will not be described in detail herein.

MME 310 is configured to receive an Uplink NAS Transport message from the mobile terminal.

In some embodiments, after the terminal establishes a signaling connection in PS domain with the LTE network, the terminal sends an Uplink NAS Transport message containing an SS message to MME 310. MME 310 receives the Uplink NAS Transport message from the mobile terminal.

MME 310 is further configured to transform an Uplink NAS Transport message into an Uplink Unitdata. Then, MME sends the Uplink Unitdata to MSC.

MME 310 is further configured to transform a Downlink Unitdata into a Downlink NAS Transport message.

Specifically, when the terminal receives an SS message from the LTE network, an SS module at the network side transmits the SS message to MSC. MSC transmits the SS message to MME through a Downlink Unitdata. Then, MME transmits the SS message to the terminal through a Downlink NAS Transport message.

MSC 320 is configured to analyze an Uplink NAS Transport message. Based on a NAS message container in the Uplink NAS Transport message, MSC determines whether or not an SS message is contained in the Uplink NAS Transport message.

In some embodiments, MSC determines whether an SS message is contained in the Uplink NAS Transport message is based on a PD field in the NAS message container.

Specifically, if the PD value is '9', the message is identified to be an SMS message, while if the PD value is '11', the message is identified to be an SS message.

MSC 320 is further configured to package an SS message to obtain a Downlink Unitdata.

Specifically, after MSC receives an SS message from an SS module, the SS message is packaged into a NAS message container of a Downlink NAS Transport message.

SS module 330 is configured to perform a supplementary service when an SS message is contained in an Uplink NAS Transport message.

In some embodiments, SS module 330 receives from MSC an Uplink Unitdata which carries an Uplink NAS Transport message. SS module 330 determines whether the SS message needs to be delivered to other network elements according the SS message content.

Specifically, if the SS message content is related to services of call forwarding setting or call waiting setting, the SS module may directly process the related services. If the SS message content is related to services of an USSD service, the SS module may transform the SS message into an USSD message which is delivered to an USSD server for processing.

Compared with the prior art, embodiments of this present disclosure have the following advantages.

An LTE network is provided in embodiments of the present disclosure, which enables an LTE terminal can directly perform CISS without falling back to a circuit-switched 3G/2G network, which may improve performances of terminals and networks, and reduce cost introduced by network switching.

In some embodiments, a supplementary service implementation method is provided.

Figure 4:
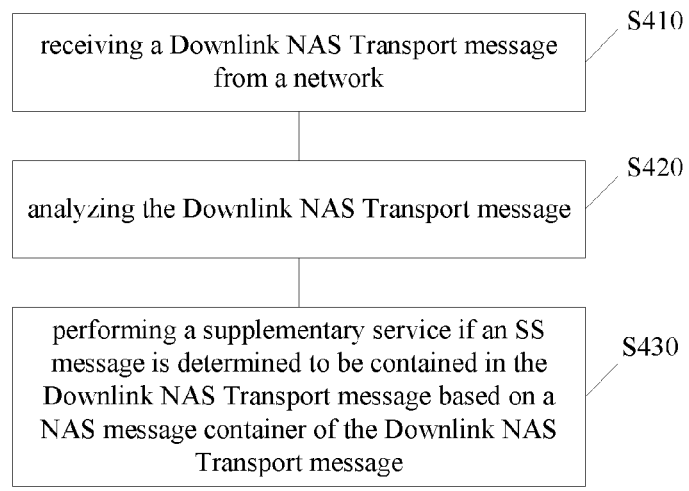
FIG. 4 schematically illustrates a flow chart of a supplementary service implementation method according to another embodiment of the present disclosure.

FIG. 4 schematically illustrates a flow chart of a supplementary service implementation method according to another embodiment of the present disclosure. The method may include steps of S410 to S430.

In S410, receive a Downlink NAS Transport message from a network.

In some embodiments, when a terminal is combinedly attached to an LTE network, the terminal establishes a signaling connection in PS domain with the LTE network. And the terminal sends a request for CISS to the network. The network sends a Downlink NAS Transport message which contains an SS message to the terminal. The terminal receives the Downlink NAS Transport message from network.

Specifically, the terminal receiving a Downlink NAS Transport message from network side may include: the terminal receiving from MME a Downlink NAS Transport message which contains an SS message.

In S420, analyze the Downlink NAS Transport message.

In some embodiments, the terminal analyzes a NAS message container of the Downlink NAS Transport message. According to a PD field in the NAS message container, the terminal may determines whether the Downlink NAS Transport message contains an SS message.

Specifically, if the PD value is '9', the message is identified to be an SMS message, while if the PD value is '11', the message is identified to be an SS message.

In S430, perform a supplementary service if an SS message is determined to be contained in the Downlink NAS Transport message based on the NAS message container of the Downlink NAS Transport message.

Specifically, the supplementary service may include call forwarding setting, call waiting setting, and so on.

In some embodiments, when a terminal wants to exchange CISS, the terminal may determine the type of a network in which the terminal is standing by. If the network is standing by in an LTE network, an SS message is packaged into an Uplink NAS Transport message which is then sent to network. And if the network is standing by in a 3G/2G network, a supplementary service may be implemented through a circuit domain of the 3G/2G network.

Specifically, in S430, the terminal may package an SS message into an Uplink NAS Transport message which is then sent to network.

Specifically, packaging an SS message into an Uplink NAS Transport message may include: writing an SS message into a NAS message container of the Uplink NAS Transport message.

Compared with the prior art, embodiments of this present disclosure have the following advantages.

An implementation method of CISS operation in an LTE network is provided in embodiments of the present disclosure, which solve problems that an LTE terminal can not directly provide CISS operations when it is in an LTE network, or it has to fall back to a circuit-switched 3G/2G network so as to support CISS. Therefore, the method improves performances of networks and mobile terminals.

In some embodiments, an implementation method of supplementary services in an LTE multi-mode terminal is provided.

Figure 5:
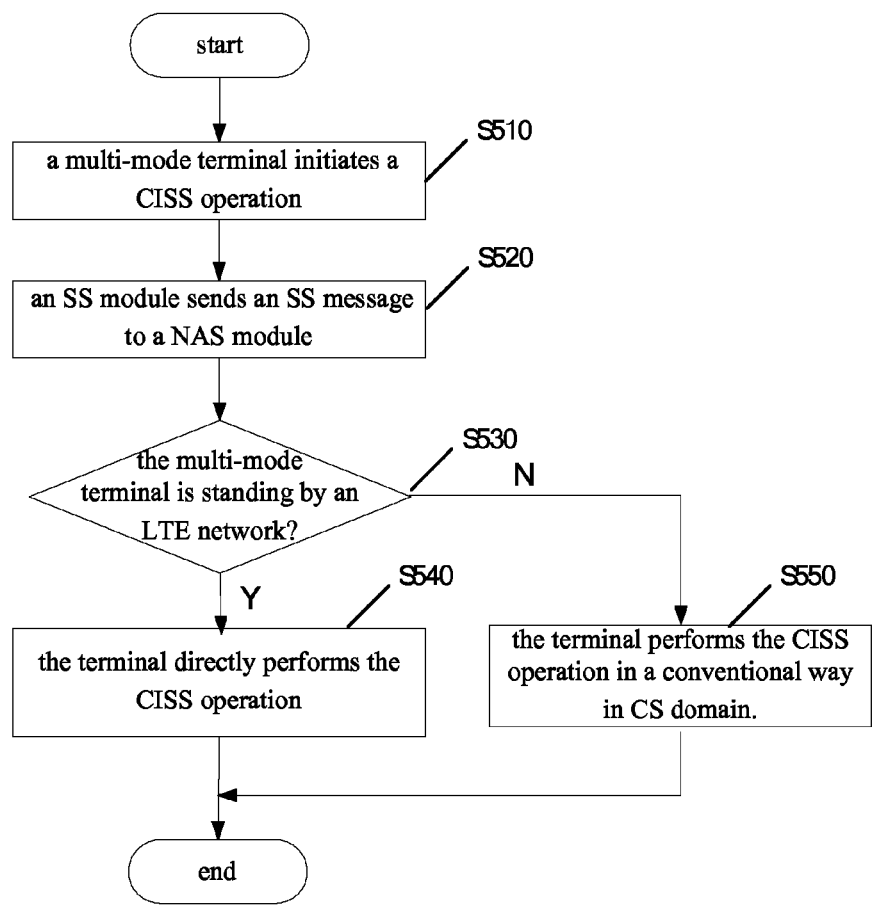
FIG. 5 schematically illustrates a flow chart of a CISS implementation method in an LTE multi-mode terminal according to one embodiment of the present disclosure.

FIG. 5 schematically illustrates a flow chart of a CISS implementation method in an LTE multi-mode terminal according to one embodiment of the present disclosure. Referring to FIG. 5, the method may include steps of S510 to S550.

In S510, a multi-mode terminal initiates a CISS operation.

In some embodiments, when a multi-mode terminal wants to perform a CISS operation, such as call forwarding setting or call waiting setting, the multi-mode terminal may send a CISS request.

The multi-mode terminal may be a terminal which can simultaneously support multiple network systems, such as an LTE network, a Code Division Multiple Access (WCDMA) network and a GSM network, but not limited thereto.

In S520, an SS module sends an SS message to a NAS module.

In some embodiments, after the multi-mode terminal sends a CISS request, an SS module may send an SS message containing the CISS request to a NAS module.

In S530, the multi-mode terminal is standing by in an LTE network.

In some embodiments, after the SS module sends the SS message to the NAS module, the NAS module determines a type of a network in which the multi-mode terminal is standing by.

The type of network may include LTE, WCDMA and GSM.

In S540, the terminal directly performs the CISS operation.

In some embodiments, if the multi-mode terminal is standing by in an LTE network, the NAS module writes an SS message into a NAS message container of an Uplink NAS Transport message. The multi-mode terminal sends the Uplink NAS Transport message containing the SS message to MME at the network side. The MME sends to MSC the Uplink NAS Transport message through an Uplink Unitdata. The MSC analyzes a PD value of the NAS message container, so as to determine an SS message is received. The MSC sends the SS message to an SS module for processing. The SS module determines whether the received message needs to be delivered to other network elements based on the SS message content. Specifically, if the CISS request is related to an USSD service, the SS module may deliver an USSD message to an USSD server.

After the network process the SS message, the SS module at the network side may send the SS message to the MSC. The MSC may send the SS message to the MME through a Downlink Unitdata. The MME may send the SS message to the multi-mode terminal through a Downlink NAS Transport message. The terminal analyzes a PD value of a NAS message container contained in the Downlink NAS Transport message, so as to determine whether an SS message is received. If yes, the terminal may sends the SS message to an SS module at the terminal side.

In S550, the terminal performs the CISS operation in a conventional way in CS domain.

In some embodiments, if the multi-mode terminal is standing by in a WCDMA or GSM network, the multi-mode terminal may performs a supplementary service in a conventional way in circuit domain.

Compared with the prior art, embodiments of this present disclosure have the following advantages.

An implementation method of supplementary services in an LTE multi-mode terminal is provided in embodiments of the present disclosure, which solve problems that an LTE terminal can not directly provide CISS operations when it is in an LTE network, or it has to fall back to a circuit-switched 3G/2G network so as to support CISS operations. Therefore, the method can reduce overheads introduced by network switching, and improve performances of LTE networks and LTE mobile terminals.

According to an implementation method of supplementary services described above, a mobile terminal is provided.

Figure 6:
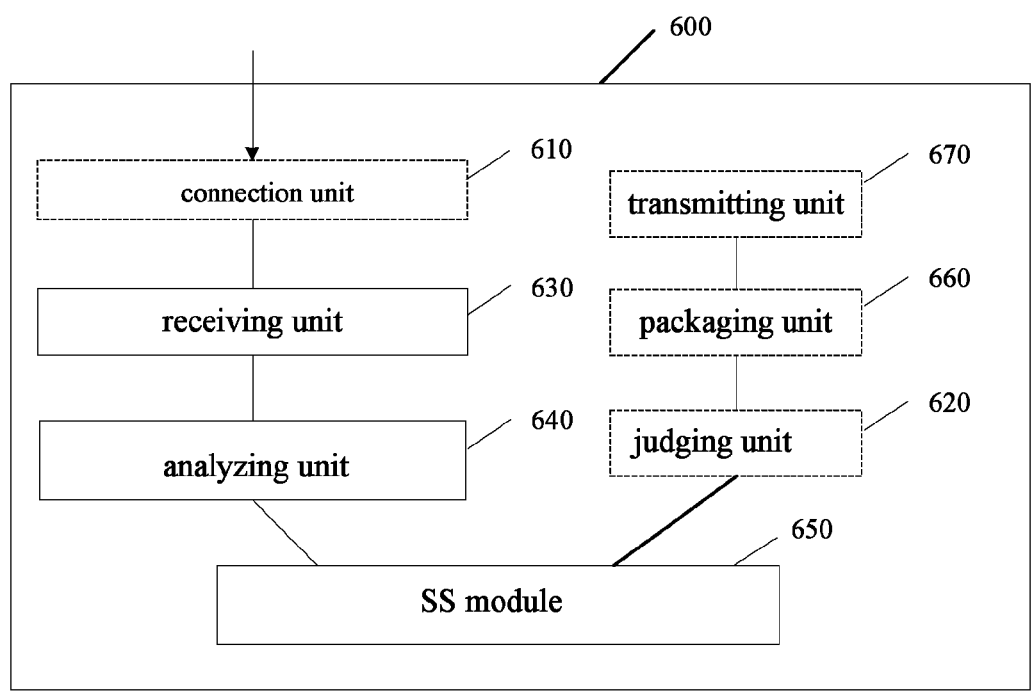
FIG. 6 schematically illustrates a structural diagram of a mobile terminal according to one embodiment of the present disclosure.

FIG. 6 schematically illustrates a structural diagram of a mobile terminal according to one embodiment of the present disclosure.

Referring to FIG. 6, the mobile terminal 600 includes: a connection unit 610, a receiving unit 630, an analyzing unit 640 and an SS module 650.

The connection unit 610 is configured to establish a connection in PS domain with the LTE network.

In some embodiments, after the terminal is combinedly attached to the LTE network, the terminal sends a request for CISS and establishes a signaling connection in PS domain with the LTE network.

Specifically, establishing a signaling connection in PS domain with the LTE network is initiated by the request for CISS, which is known to those skilled in the art, and will not described in detail herein.

The receiving unit 630 is configured to receive a Downlink NAS Transport message from network side.

In some embodiments, after the terminal establishes a signaling connection in PS domain with the LTE network through the connection unit 610, the terminal sends a request for CISS. The network sends a Downlink NAS Transport message containing the SS message to the terminal.

In some embodiments, the terminal receiving a Downlink NAS Transport message from network side may include: the terminal receiving from MME a Downlink NAS Transport message containing the SS message.

The analyzing unit 640 is configured to analyze the Downlink NAS Transport message received from network side and determine whether an SS message is contained in the Downlink NAS Transport message based on a NAS message container in the Downlink NAS Transport message.

In some embodiments, the terminal analyzes a PD field in the NAS message container and identifies an SS message according to the PD value.

Specifically, the PD value of '11' may signify an SS message contained in the Downlink NAS Transport message, while the PD value of '9' may signify an SMS message contained in the Downlink NAS Transport message.

The SS module 650 in the terminal is configured to perform a supplementary service if the analyzing unit 640 determines that an SS message is contained in the Downlink NAS Transport message.

In some embodiments, the SS module 650 performs a supplementary service according to the SS message content in the Downlink NAS Transport message.

The terminal may further include a judging unit 620, a packaging unit 660 and a transmitting unit 670.

The judging unit 620 is configured to determine a type of a network in which the terminal is standing by, after an SS message to be transmitted to the network is generated.

In some embodiments, when the terminal initiates a request for CISS, NAS determines a type of a network in which the terminal is standing by. Specifically, NAS determines the terminal is standing by in an LTE network or a 3G/2G network. If the terminal is standing by in an LTE network, the SS message is packaged into an Uplink NAS Transport message which is then sent to network side. And if the network is standing by in a 3G/2G network, a supplementary service may be implemented through a circuit domain of the 3G/2G network.

The packaging unit 660 is configured to package an SS message into an Uplink NAS Transport message.

The packaging unit 660 packages an SS message into an Uplink NAS Transport message in the event that the terminal wants to perform a CISS operation.

The transmitting unit 670 is configured to send the Uplink NAS Transport message to network side.

Compared with the prior art, embodiments of this present disclosure have the following advantages.

An LTE mobile terminal is provided in embodiments of the present disclosure, which solve problems that an LTE terminal can not directly provide CISS operations when it is in an LTE network, or it has to fall back to a circuit-switched 3G/2G network so as to support CISS operations, which thereby improves performances of networks and mobile terminals.

Embodiments of this present disclosure may be described in general contexts of executable instructions which can be executed by user devices. A programming module which can execute the above instructions may locate at a local storing medium including a storage device. The storing medium may be any kind of medium which can be used to store programming codes, including ROM, RAM, a disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

We claim:

1. An implementation method of supplementary service, comprising:
   receiving an Uplink Transport message from a mobile terminal;
   analyzing the Uplink Transport message; and
   performing a supplementary service if a Supplementary Service (SS) message is determined to be contained in the Uplink Transport message based on a message container of the Uplink Transport message;
   wherein the Uplink Transport message is an Uplink Non-Access Stratum (NAS) Transport message, and the message container is a NAS message container,
   wherein analyzing the Uplink NAS Transport message comprises: receiving an Uplink Unitdata message transformed from the Uplink NAS Transport message, and analyzing the NAS message container in the Uplink Unitdata message, and
   wherein if the mobile terminal determines that the mobile terminal is standing by a Long Term Evolution (LTE) network, then the mobile terminal directly performs a Call Independent Supplementary Service (CISS) operation by transmitting the Uplink Transport message.

2. The method according to claim 1, wherein analyzing the NAS message container in the Uplink Unitdata message comprises: determining, according to a PD field in the NAS message container, whether an SS message is contained in the Uplink NAS Transport message.

3. The method according to claim 1, wherein the step of receiving an Uplink NAS Transport message from a mobile terminal is performed by MME; the step of analyzing the Uplink NAS Transport message is performed by MSC; and the step of performing a supplementary service is performed by an SS module, and wherein the MME transforms the Uplink NAS Transport message into the Uplink Unitdata message; the MSC receives the Uplink Unitdata message from the MME, and determines, according to the PD field in the NAS message container, whether an SS message is contained in the Uplink NAS Transport message; and the SS module performs the supplementary service if an SS message is contained in the Uplink NAS Transport message.

4. The method according to claim 1, further comprising: packaging the SS message into a Downlink NAS Transport message; and sending the Downlink NAS Transport message to the mobile terminal, wherein packaging the SS message into a Downlink NAS Transport message comprises: writing the SS message into a NAS message container of the Downlink NAS Transport message, and wherein the SS message comprises an identifier which is contained in a PD field of the NAS message container of the Downlink NAS Transport message.

5. The method according to claim 1, further comprising: packaging the SS message into a Downlink NAS Transport message; and sending the Downlink NAS Transport message to the mobile terminal, wherein packaging the SS message into a Downlink NAS Transport message comprises: packaging the SS message into a Downlink Unitdata message; and transforming the Downlink Unitdata message to a Downlink NAS Transport message.

6. A Long Term Evolution (LTE) network system, comprising:
- a Mobile Management Entity (MME), configured to receive an Uplink Transport message from a mobile terminal;
- a Mobile Switching Center (MSC), configured to analyze the Uplink Transport message and determine, based on a Non-Access Stratum (NAS) message container of the Uplink Transport message, whether a Supplementary Service (SS) message is contained in the Uplink Transport message; and
- an SS module, configured to perform a supplementary service if an SS message is determined to be contained in the Uplink Transport message,
- wherein the Uplink Transport message is an Uplink NAS Transport message, and a message container is a NAS message container,
- and wherein the MME is further configured to transform the Uplink NAS Transport message into an Uplink Unitdata message, and the MSC is configured to analyze a NAS message container in the Uplink Unitdata message, and
- wherein if the mobile terminal determines that the mobile terminal is standing by an LTE network, then the mobile terminal directly performs a Call Independent Supplementary Service (CISS) operation by transmitting the Uplink Transport message.

7. The LTE network system according to claim 6, wherein the MSC is further configured to package the SS message into a Downlink Unitdata message; and the MME is further configured to transform the Downlink Unitdata message into a Downlink NAS Transport message.

8. The LTE network system according to claim 6, wherein the Uplink Transport message is an Uplink Generic NAS Transport message; and the message container is a Generic NAS message container, wherein the MSC is further configured to package the SS message into a Downlink Unitdata message; and the MME is further configured to transform the Downlink Unitdata message into a Downlink Generic NAS Transport message.

9. An implementation method of supplementary service, comprising:
- receiving a Downlink Transport message from a network;
- analyzing the Downlink Transport message; and
- performing a supplementary service if a Supplementary Service (SS) message is determined to be contained in the Downlink Transport message based on a message container of the Downlink Transport message, wherein the Downlink Transport message is a Downlink Non-Access Stratum (NAS) Transport message, and the message container is a NAS message container; and
- wherein analyzing the Downlink NAS Transport message comprises: determining, according to a Protocol Discriminator (PD) field in the NAS message container, whether an SS message is contained in the Downlink NAS Transport message, and
- wherein if a mobile terminal determines that the mobile terminal is standing by a Long Term Evolution (LTE) network, then the mobile terminal directly performs a Call Independent Supplementary Service (CISS) operation which comprises receiving the Downlink Transport message.

10. The method according to claim 9, further comprising: packaging the SS message into an Uplink NAS Transport message; and sending the Uplink NAS Transport message to the network, wherein packaging the SS message into an Uplink NAS Transport message comprises: writing the SS message into a NAS message container of the Uplink NAS Transport message, and wherein the SS message comprises an identifier which is contained in the PD field of the NAS message container of the Uplink NAS Transport message.

11. A mobile terminal, comprising:
- a receiving unit, configured to receive an Downlink Transport message from a network;
- an analyzing unit, configured to analyze the Downlink Transport message and determine, based on a message container of the Downlink Transport message, whether a Supplementary Service (SS) message is contained in the Downlink Transport message; and
- an SS module, configured to perform a supplementary service if the SS message is determined to be contained in the Downlink Transport message, wherein the Downlink Transport message is a Downlink Non-Access Stratum (NAS) Transport message, and the message container is a NAS message container, and
- wherein if the mobile terminal determines that the mobile terminal is standing by a Long Term Evolution (LTE) network, then the mobile terminal directly performs a Call Independent Supplementary Service (CISS) operation which comprises receiving the Downlink Transport message.

* * * * *